United States Patent
Chae et al.

(10) Patent No.: US 10,599,537 B2
(45) Date of Patent: Mar. 24, 2020

(54) FAILURE DIAGNOSIS APPARATUS AND METHOD FOR IN-VEHICLE CONTROL UNIT

(71) Applicants: Hyundai Motor Company, Seoul (KR); Kia Motors Corporation, Seoul (KR)

(72) Inventors: Jun Byung Chae, Seoul (KR); Byeong Geon Jeon, Pohang-si (KR); Dong Ok Kim, Goyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 156 days.

(21) Appl. No.: 15/828,784

(22) Filed: Dec. 1, 2017

(65) Prior Publication Data
US 2019/0079842 A1    Mar. 14, 2019

(30) Foreign Application Priority Data
Sep. 13, 2017   (KR) .................. 10-2017-0117160

(51) Int. Cl.
*G06F 11/00*    (2006.01)
*G06F 11/30*    (2006.01)
(Continued)

(52) U.S. Cl.
CPC .......... *G06F 11/3013* (2013.01); *G05B 23/02* (2013.01); *G06F 11/3006* (2013.01);
(Continued)

(58) Field of Classification Search
CPC ............. G06F 11/3013; G06F 11/3006; G06F 11/0739; G06F 11/0736; G06F 11/0709;
(Continued)

(56) References Cited

U.S. PATENT DOCUMENTS 7,639,617 B2   12/2009   Chapman et al.
9,538,374 B2   1/2017    Kaufmann et al.
(Continued)

FOREIGN PATENT DOCUMENTS

CN         101741766 A        6/2010
KR      10-2014-0076692       6/2014
(Continued)

OTHER PUBLICATIONS

BSI Standards Publication, BS ISO 134000-2:2012; Road Vehicles—Diagnostics communication over Internet Protocol (DoIP), Part 2: Transport protocol and network layer services, Jun. 1, 2012, 80 pages (Year: 2012).*

*Primary Examiner* — Joseph D Manoskey
(74) *Attorney, Agent, or Firm* — Morgan, Lewis & Bockius LLP

(57) ABSTRACT

An apparatus, for performing a diagnostic operation on plural controllers which are coupled via different types of in-vehicle communication networks, may include at least one of a message generator, configured to generate a diagnostic message used for the diagnostic operation on the plural controller, and a message receiver, configured to recognize the diagnostic message, wherein the diagnostic message that may be communicated over the in-vehicle communication networks includes a header and a payload, and wherein the payload is determined to correspond to a length of communication data for a controller area network (CAN).

20 Claims, 13 Drawing Sheets

(51) Int. Cl.
*H04L 12/40* (2006.01)
*G05B 23/02* (2006.01)
(52) U.S. Cl.
CPC ........ *H04L 12/40* (2013.01); *H04L 12/40176* (2013.01); *H04L 2012/40215* (2013.01); *H04L 2012/40273* (2013.01)
(58) Field of Classification Search
CPC ... G05B 23/20; H04L 12/40; H04L 12/40176; H04L 2012/40215; H04L 2012/40273
See application file for complete search history.

(56) References Cited

U.S. PATENT DOCUMENTS

| | | | |
|---|---|---|---|
| 2013/0159466 A1 | 6/2013 | Mao | |
| 2013/0173751 A1* | 7/2013 | Zachos | H04L 69/08 709/219 |
| 2014/0012947 A1 | 1/2014 | Schaller | |
| 2014/0023068 A1* | 1/2014 | Kim | H04L 45/72 370/355 |
| 2014/0189814 A1 | 7/2014 | Marten et al. | |
| 2016/0080168 A1* | 3/2016 | Lieder | H04L 12/40032 370/468 |
| 2016/0112216 A1* | 4/2016 | Sargent | H04L 12/66 370/328 |
| 2016/0182341 A1* | 6/2016 | Fischer | B60W 50/0205 370/251 |
| 2018/0343326 A1* | 11/2018 | Wildfeuer | H04L 69/18 |
| 2019/0140859 A1* | 5/2019 | Kern | G07C 5/008 |

FOREIGN PATENT DOCUMENTS

| | | |
|---|---|---|
| KR | 10-1630729 B | 6/2016 |
| WO | WO 2009/140707 A1 | 11/2009 |

\* cited by examiner

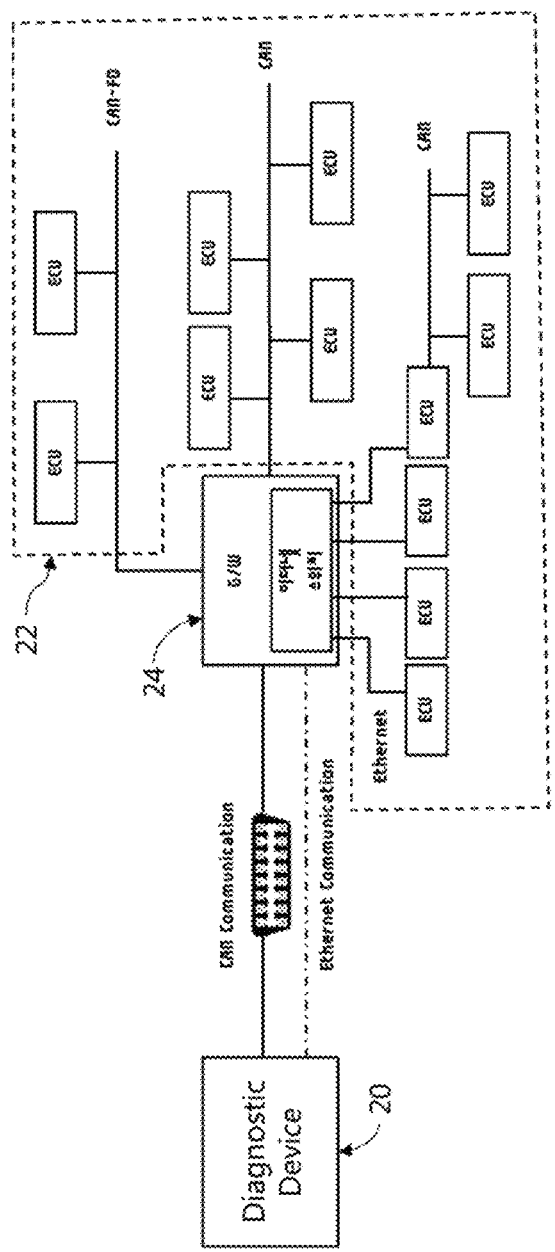

| Ver. (ex.) | Classification | Contents |
|---|---|---|
| 0xCA | Diagnostic | Target Controller, IP Address = CAN ID (Diagnostic Operation is performed) |
| 0xCB | Remote Diagnostic | Message from not external diagnostic device but internal diagnostic device |
| 0xCC | Diagnostic Routing | Target Controller, IP Address ≠ CAN ID (Routing diagnostic message) |
| 0xCD | Reprograming | Define Payload upto 4G (1:1 large volume data communication) Corresponding to FOTA |

FIG.5A

| Payload Type | Contents |
|---|---|
| 0x8001 | TCP Diagnostic Message |
| 0x8002 | ACK |
| 0x8003 | NACK |
| Extra Definition | Reprograming |

FIG.5B

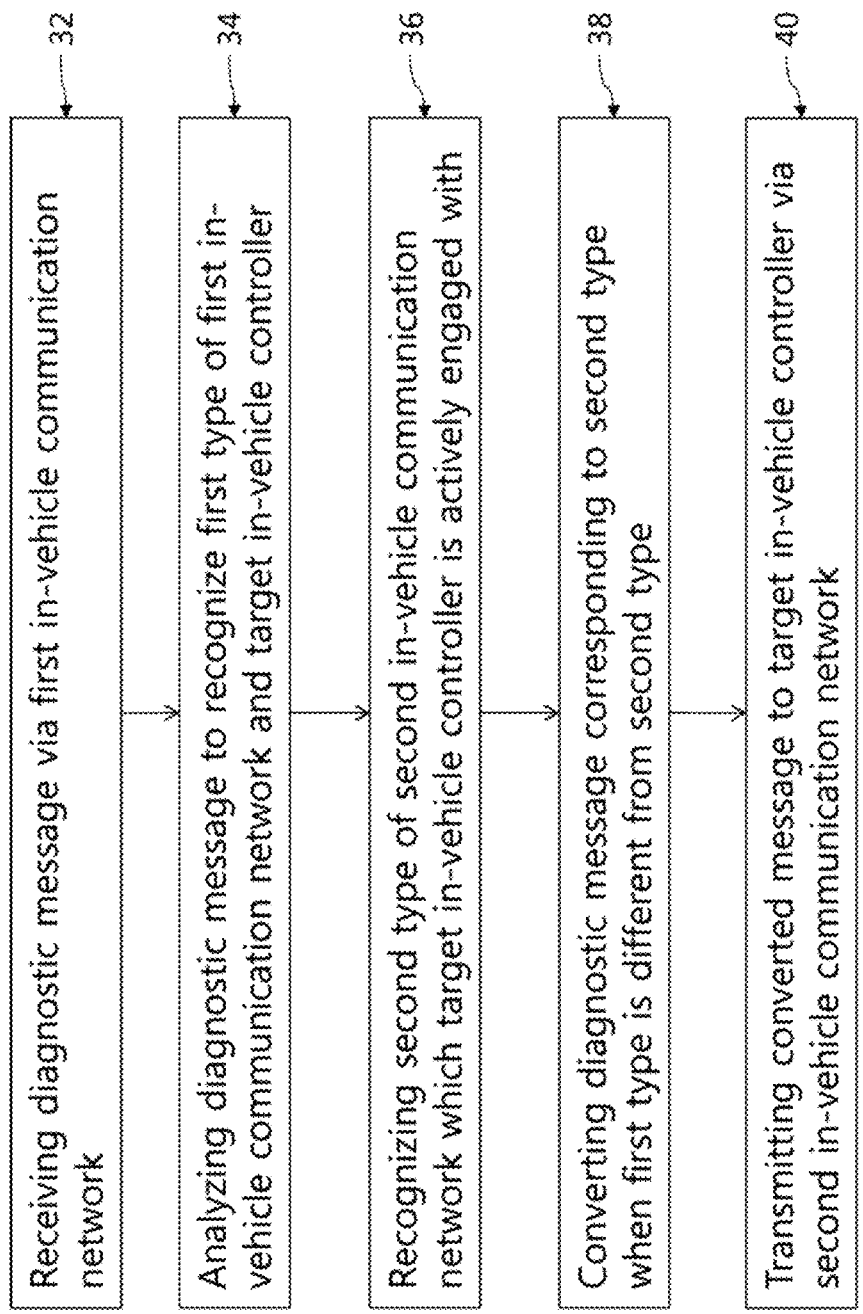

FAILURE DIAGNOSIS APPARATUS AND METHOD FOR IN-VEHICLE CONTROL UNIT

CROSS-REFERENCE TO RELATED APPLICATION

The present application claims priority to Korean Patent Application No. 10-2017-0117160, filed on Sep. 13, 2017, the entire contents of which is incorporated herein for all purposes by this reference.

BACKGROUND OF THE INVENTION

Field of the Invention

The disclosure relates to a method and an apparatus for diagnosing a failure of a vehicular device, and more particularly, to a method and apparatus for diagnosing a failure of electronic systems or devices, mounted on or provided in a vehicle, which are operated and coupled with each other through different communication methods or networks.

Description of Related Art

With the development of vehicle technology, various electronic control modules are installed in a vehicle, and these electronic control modules can control various devices or systems mounted on the vehicle. Examples of electronic control modules are an engine control module (ECU), a transmission control unit (TCU), an airbag control module (ACU), an antilock brake system module (ABS), a meter and driver information module (INST), and the like.

The electronic control module is connected via an in-vehicle communication network (e.g., CAN network, etc.) and is capable of monitoring various control inputs and operating parameters delivered via the vehicle communication network and controlling the various devices or systems based on the control inputs and the operating parameters. For example, an engine control module (ECM) may receive inputs of accelerator pedal deflation to control the ignition and fuel system of the engine. Furthermore, the engine control module (ECM) can monitor an engine speed, a torque, and other operating parameters to optimize engine performance. Some control or operational parameters monitored by a single module may be also requested by one or more other modules. For example, the engine speed monitored by the engine control module may be requested by a transmission control module, a brake release module, and an instrument and driver information module. The wheel speed monitored by the anti-lock brake system module may also be used by the engine control module and the transmission control module for traction control purposes.

Since various modules are interconnected via an in-vehicle communication network (e.g., controller area network (CAN)), data or information can be interchanged between the various modules. Furthermore, the various modules can be implemented in a form of integrated chip or board. The CAN network, which is used as an in-vehicle communication network, can connect a plurality of electronic control modules to each other. The CAN can be considered an example of a vehicular network, which has stability and reliability accumulated for a long time. Recently, as the number of electronic devices and systems mounted on a vehicle has increased, the internal signal delivered within the vehicle has increased dramatically. Accordingly, it could be required that other communication methods applicable to the vehicle are combined or harmonized with the CAN.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus and a method for securing a diagnostic communication scheme that can cope with various network types, communication methods or topologies applicable to a vehicle.

Furthermore, the disclosure can provide a method and an apparatus configured for diagnosing in-vehicle devices coupled via a Ethernet only and not a controller area network (CAN), or via the CAN used as a main network with the Ethernet as a sub network in the vehicle.

Furthermore, the disclosure overcomes an issue that it is not possible to diagnose control devices connected via the Ethernet through a Diagnosis over Internet Protocol (DoW) defined by the International Organization for Standardization (ISO), and can provide an apparatus and a method for facilitating a diagnosis procedure with in-vehicle devices coupled via a combination of the CAN and Ethernet.

An apparatus can be for performing a diagnostic operation on plural controllers which are coupled via different types of in-vehicle communication networks. The apparatus may include at least one of a message generator, configured to generate a diagnostic message used for the diagnostic operation on the plural controller, and a message receiver, configured to recognize the diagnostic message. Herein, the diagnostic message that may be communicated over the in-vehicle communication networks includes a header and a payload. Herein, the payload is determined to correspond to a length of communication data for a controller area network (CAN).

The message generator may include a diagnostic device configured to be coupled with an in-vehicle gateway via an on-board diagnostics (OBD) terminal or an Ethernet network.

The message receiver may include an in-vehicle gateway configured to identify the diagnostic message in a response to the different types of in-vehicle communication networks and to transmit identified message to at least one of the plural controllers.

The in-vehicle communication networks may include an Ethernet communication network, the CAN, and a CAN-Flexible Data-Rate (CAN-FD).

The diagnostic message can be transferred via not a User Datagram Protocol (UDP) of a transport layer protocol, but a Transmission Control Protocol (TCP).

The header may include a first field designated for determining a protocol version; a second field designated for including an inverse value of the protocol version; a third field designated for determining either the payload or a type of the payload; and a fourth field designated for determining either the payload or a length of the payload.

The fourth field can specify that the length of the payload is 10 bytes.

The first field may include at least one of a first data indicating that an IP address of a target controller which the diagnostic message is transmitted to is the same as or substantially the same as a CAN ID (ID for the CAN) of the target controller; a second data indicating that the diagnostic message is requested by the vehicle; a third data indicating that the IP address of the target controller is different from the CAN ID of the target controller; and a fourth data making the length of the payload correspond to a length of communication data for an Ethernet network.

The fourth data can be used when data is transmitted to the target controller for software update.

The third field may include a first data used for diagnosing a target controller which the diagnostic message is transmitted to; and a second data used for confirming whether the target controller is available on the plural controllers.

The payload may include a first field including a CAN ID (ID for the CAN); and a second field matched with the communication data for the CAN. Herein, a length of the second field can be 8-byte.

A length of the communication data for the CAN may be 11 bits while a length of the first field can be 2 bytes.

The first byte of the second field having 8 bytes may include control information for determining a value of at least one of an arbitration field and a control field in a CAN communication message.

The control information may include at least one of whether to expand the CAN communication message, a data length code, and a value for controlling collision between messages.

A method is for operating an in-vehicle gateway engaged with plural controllers via different-type in-vehicle communication networks to perform a diagnostic operation. The method may include receiving a diagnostic message via a first in-vehicle communication network; analyzing the diagnostic message to recognize a first type of the first in-vehicle communication network and a target controller which the diagnostic message is transmitted to; recognizing a second type of a second in-vehicle communication network which the target controller is actively engaged with; converting the diagnostic message corresponding to the second type when the first type is different from the second type; and transmitting converted message to the target controller via the second in-vehicle communication network.

The analyzing the diagnostic message may include at least one of recognizing that the diagnosis message is a controller area network (CAN) communication message when the diagnosis message is delivered an on-board diagnostics (OBD) terminal; and recognizing that the diagnostic message is an Ethernet communication message when the diagnostic message is delivered through an Ethernet port or a telematics device.

The in-vehicle communication networks may include an Ethernet communication network, the CAN, and a CAN-Flexible Data-Rate (CAN-FD).

The converting the diagnostic message may include one of converting a CAN communication message into an Ethernet communication message and converting the Ethernet communication message into the CAN communication message.

The plural controllers may include at least one controller coupled with the in-vehicle gateway via an Ethernet communication network, and a connection between the at least one controller and the in-vehicle gateway may keep alive even when the at least one controller is not working.

A vehicle may include a plurality of controllers, each configured for providing information related to vehicle's running to a driver or an occupant or controlling a vehicular device; a plurality of in-vehicle communication networks, each connecting at least two of the plurality of controllers to each other; at least one gateway configured to connect each of the plurality of controllers; and an input-output device configured to receive a diagnostic message for diagnosing the plurality of controllers, to transmit the diagnostic message to the at least one gateway, and to output a diagnostic result. Herein, the at least one gateway can be connected via an Ethernet network when the input-output device is at least one of an Ethernet communication port and a telematics device. Herein, the at least one gateway can be connected via a controller area network (CAN) when the input-output device is an on-board diagnostics (OBD) terminal.

When the at least one gateway includes plural gateways, the plural gateways can be directly connected to each other via the Ethernet network.

An apparatus for charging or discharging a vehicle may include a processing system that includes at least one data processor and at least one computer-readable memory storing a computer program. Herein, the processing system is configured to cause the apparatus to receiving a first power signal in a response to a fee schedule on the first power signal to charge a battery; and transmit an electrical energy stored in the battery as a second power signal in a response to the fee schedule when a charging status of the battery is beyond a predetermined level.

Advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure pointed out in the written description and claims hereof as well as the appended drawings.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 shows a vehicle including a plurality of electronic control modules engaged with each other via a plurality of different communication networks;

FIG. 4A and FIG. 4B show a format of the diagnostic message;

FIG. 5A and FIG. 5B describe a portion of the diagnostic message shown in FIG. 4A and FIG. 4B;

FIG. 6 shows a method of operating a vehicle gateway;

Figure 1:
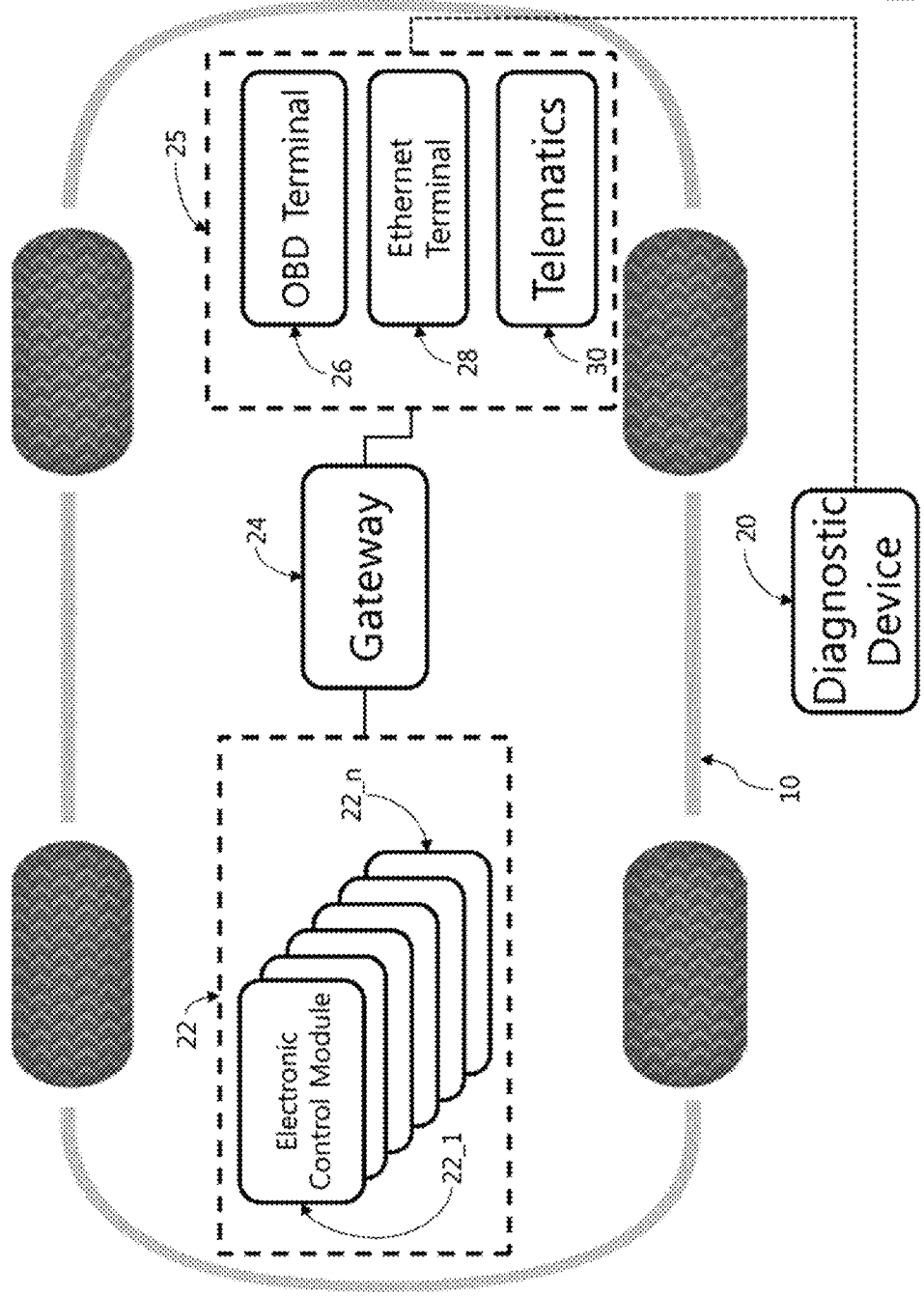
FIG. 1 shows a vehicle including a plurality of electronic control modules and a vehicle diagnostic apparatus that can be connected to the vehicle.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Reference will now be made more specifically to the exemplary embodiments of the invention, examples of which are illustrated in the accompanying drawings. In the drawings, the same elements are denoted by the same reference numerals, and a repeated explanation thereof will not be given. The suffixes "module" and "unit" of elements herein are used for convenience of description and thus can be used interchangeably and do not have any distinguishable meanings or functions.

The terms "a" or "an", as used herein, are defined as one or more than one. The term "another", as used herein, is defined as at least a second or more. The terms "including" and/or "having" as used herein, are defined as including (i.e. open transition). The term "coupled" or "operatively coupled" as used herein, is defined as connected, although not necessarily directly, and not necessarily mechanically.

In the description of the invention, certain detailed explanations of related art are omitted when it is deemed that they may unnecessarily obscure the essence of the invention. The features of the invention will be more clearly understood from the accompanying drawings and should not be limited by the accompanying drawings. It is to be appreciated that all changes, equivalents, and substitutes that do not depart from the spirit and technical scope of the invention are encompassed in the invention.

FIG. 1 shows a vehicle including a plurality of electronic control modules and a vehicle diagnostic apparatus that can be connected to the vehicle.

As shown, a vehicle 10 may include an electric device 22 configured to collect information necessary for driving, information required during driving or information for enhancing driving safety, and to provide and transmit collected information to a user, a driver or a passenger. The electric device 22 may include a plurality of electronic control modules 22_1 to 22_n. The plurality of electronic control modules 22_1 to 22_n may be connected to each other via an in-vehicle network to exchange data therebetween. The plurality of electronic control modules 22_1 to 22_n may include an information collecting device including a detector and a camera as well as an information processing device configured to process collected information and generate new information, for example, to perform determinations according to predetermined programs and functions based on the collected information, and the like.

The plurality of electronic control modules 22_1 to 22_n may be connected to each other through a sub-network structure organized under at least one in-vehicle gateway 24. The vehicle gateway 24 may include a computing device and a program that enable communication between networks including different types and protocols of in-vehicle communication networks. Furthermore, the vehicle gateway 24 may be a network point provided as an entrance to different types of in-vehicle communication networks. The vehicle gateway 24 may also act as a channel between different types of in-vehicle communication networks.

The vehicle 10 may include at least one vehicle gateway 24. The number of the gateways 24 can be determined based on a vehicular network structure or scheme and the number of the electronic control modules 22_1 to 22_n provided within, or mounted on, the vehicle.

A vehicle diagnostic apparatus 20 configured to diagnose the plurality of electronic control modules 22_1 to 22_n mounted on the vehicle 10 can be connected to or engaged with the vehicle 10. The diagnostic device 20 can diagnose the plurality of electronic control modules 22_1 to 22_n coupled through different types of in-vehicle communication networks. The diagnostic device 20 can be physically separate from the vehicle, and may be in a form of a terminal that can be coupled to the vehicle through terminals included in the vehicle. Also, according to an exemplary embodiment of the present invention, the diagnostic apparatus 20 can be in a form of a network server configured for checking the plurality of electronic control modules 22_1 to 22_n mounted on a vehicle via a wire/wireless communication network and collecting data from the plurality of electronic control modules 22_1 to 22_n.

On the other hand, between the diagnostic apparatus 20 and the vehicle gateway 24, there may be an input-output device 25 configured to support a diagnostic process to transfer a diagnostic message and collect result data. By the way of example, the input-output device 25 may include an On-Board Diagnostic (OBD) terminal 26 disposed in the vehicle. Herein, On-Board Diagnostics (OBD) refers to a diagnostic standard for checking and controlling operation status of the electronic control modules or in-vehicle devices included in the vehicle 10. Previously, the On-Board Diagnostics (OBD) was used to enhance an efficiency of maintenance about vehicular components including engine, which are digitalized. In addition to the present purpose, the On-Board Diagnostics (OBD) can serve as an interface as a trip computer which displays various vehicle information to the driver.

According to an exemplary embodiment of the present invention, the vehicle 10 may include an Ethernet terminal 28. The Ethernet terminal 28 may be unnecessary if the in-vehicle communication network includes a controller area network (CAN) only. However, as the number of the plurality of electronic control modules 22_1 to 22_n mounted on the vehicle 20 increases and the amount of data transmitted and received by the plurality of electronic control modules 22_1 to 22_n increases, the controller area network (CAN) as well as an Ethernet communication network can be included in the vehicle 10. By the way of example but not limitation, the maximum transmission bandwidth in the controller area network (CAN) may be 1 Mbps. Such a speed of the controller area network (CAN)

may not be sufficient when the number of the plurality of electronic control modules 22_1 to 22_n in the vehicle is increased and data traffic is increased due to real-time video transmission (for example, top view or around view monitoring). On the other hand, the data rate of CAN-FD can be up to 2 Mbit/s in multi-drop network and 5 Mbit/s in point-to-point communication, while the data rate of Ethernet is 1 Gbps. Therefore, the vehicle diagnostic apparatus 20 may be connected through the Ethernet terminal 28 during a procedure of checking and controlling an electric or electronic operation status of the vehicle 10.

Also, the telematics device 30 mounted on the vehicle 10 can be served as the input-output device 25. The telematics device 30 is an example of the input-output device 25 which can be configured for providing location information and a comprehensive multimedia service to a driver and an occupant. The telematics device 30 can provide a driver with safe driving, emergency rescue, traffic guidance service, while providing an occupant with some infotainment services including Internet, movies, games, multimedia. The telematics device 30 may be engaged with a network server for diagnosing operation states of the plurality of electronic control modules 22_1 to 22_n mounted on the vehicle to verify the plurality of electronic control modules 22_1 to 22_n, e.g., transmitting diagnostic messages to the plurality of electronic control modules 22_1 to 22_n, and delivering data transmitted from the plurality of electronic control modules 22_1 to 22_n to the network server.

According to an exemplary embodiment of the present invention, the vehicle 10 may include a plurality of controllers (e.g., 22) configured to be configured for providing information to the driver or occupant with regard to driving or controlling the driving, a plurality of vehicle networks for coupling the plurality of controllers with each other, at least one gateway (e.g., 24) configured to control an access to the plurality of vehicle, an input-output device (e.g., 25) configured to receive a diagnostic message for diagnosing the plurality of controllers, transmit the diagnostic message to the at least one gateway, and output diagnostic results delivered from the plurality of controllers.

The plurality of vehicle networks may include an Ethernet communication network, a Controller Area Network (CAN), a CAN with flexible data rate (CAN) FD, a Local Interconnect Network (LIN), a Media Oriented Systems Transport (MOST), and the like. Herein, the input-output device 25 may include at least one of the ODB terminal 26, the Ethernet terminal 28, and the telematics device 30.

The vehicle 10 may include different-type in-vehicle networks for connection between the input-output device 25 and the at least one vehicle gateway 24. By the way of example but not limitation, the connection between at least one of the Ethernet terminal 28 and the telematics device 30 and at least one vehicle gateway 24 may be implemented based on an Ethernet communication scheme. But, the connection between the OBD terminal 26 as the input-output device and the at least one gate way 24 may be implemented based on a CAN communication method different from the Ethernet communication scheme.

According to an exemplary embodiment of the present invention, in a case when a plurality of in-vehicle gateways 24 are provided in the vehicle 10, the connection between the two gateways, if two in-vehicle gateways are directly connected to each other, may be an Ethernet network scheme.

The diagnostic message delivered via the in-vehicle gateway 24 can be transferred via not a User Datagram Protocol (UDP) of a transport layer protocol, but a Transmission Control Protocol (TCP). By the way of example but not limitation, diagnostics over IP (DoW) based on IEEE802.3 and IPv4/IPv6 can be used for diagnostic access. The system for vehicle diagnosis may include at least one of a message generator configured to generate a diagnostic message for diagnosing a plurality of controllers mounted on the vehicle and a message receiver configured to recognize the diagnostic message.

By the way of example but not limitation, a maintenance and diagnostic device configured for checking the in-vehicle electronic control module may include a diagnostic device connected to the in-vehicle gateway via an OBD terminal or Ethernet. Herein, the diagnostic device may include a message generator.

Furthermore, the maintenance and diagnostic device configured for checking the in-vehicle electronic control module may include an in-vehicle gateway which is configured for distinguishing and transmitting diagnostic messages according to a type of communication network scheme. Herein, the in-vehicle gateway may include a message receiver.

FIG. 2 shows a vehicle including a plurality of electronic control modules engaged with each other via a plurality of different communication networks.

As shown, a plurality of controllers (ECUs) 22 may be mounted on the vehicle. The plurality of controllers (ECUs) 22 can be connected to each other via different in-vehicle networks (e.g., CAN, CAN-FD, and Ethernet) to transmit and receive diagnostic data. The in-vehicle network may include an Ethernet network, a Controller Area Network (CAN), a CAN-Flexible Data-Rate (CAN-FD), a Local Interconnect Network (LIN) communication, a MOST (Media Oriented Systems Transport) and the like.

The plurality of controllers 22 can communicate with other in-vehicle devices connected on the in-vehicle network via an in-vehicle gateway 24. The in-vehicle gateway 24 can perform switching functions between a plurality of in-vehicle networks including a CAN. By the way of example but not limitation, the in-vehicle gateway 24 configured to transmit messages and signals according to the diagnosis protocol (DoIP) for networking with an external diagnosis server 20 and an diagnostic device 20 on the basis of Ethernet/IP network scheme. The in-vehicle gateway 24 can provide scheduling and protocol conversion functions for interworking with controllers based on CAN, LIN, FlexRay or the like. For the reference, in FIG. 2, the in-vehicle gateway 24 may include an Ethernet switch.

According to an exemplary embodiment of the present invention, the in-vehicle gateway 24 may be connected to the diagnostic device 20 via a CAN communication method via an OBD terminal. Furthermore, according to an exemplary embodiment of the present invention, the in-vehicle gateway 24 may be connected to the diagnostic device 20 via Ethernet network.

The in-vehicle gateway 24 can determine an interface for communication with the diagnostic device 20. On the other hand, when an external interface of the vehicle operates on CAN communication, supporting CAN communication for diagnosis may be required to according to the regulation or utilization of diagnostic equipment. Also, the in-vehicle gateway 24 can provide a communication interface inside the vehicle. It is possible to provide a communication environment including a plurality of different communication schemes, e.g., CAN (high-speed CAN, low-speed CAN), CAN-FD and Ethernet communication schemes where plural controllers actively operate on.

Furthermore, the in-vehicle gateway 24 may provide an interface for diagnosing another controller through a controller (ECU) included in an Ethernet-based domain. By the way of example but not limitation, an interface may be provided even if the in-vehicle gateway 24 is connected a plurality of times, or an in-vehicle controller can perform a gateway function to be connected to controllers through different in-vehicle networks.

By the way of example but not limitation, the path through which diagnostic messages are transmitted to the diagnostic device 20, the OBD terminal, the in-vehicle gateway, the controller included in the Ethernet-based domain, and the controller to be diagnosed connected to the controller may be very complicated and long. Herein, the diagnostic message needs to be changed, processed and manipulated to be suitable for each communication scheme so that diagnostic messages can be transmitted between respective components that can be connected according to different communication schemes. That is, the in-vehicle gateway 24 must be able to support diagnostic communication which is compatible with the communication schemes or topology configuration for each controller. Furthermore, to prevent issues due to an increase data transmitted through the in-vehicle gateway 24, a message format is required to minimize a load for routing and/or communication conversion via the in-vehicle gateway 24. Furthermore, it is necessary to minimize the number of modules including devices, programs, and the like, which can handle with data on a different-type communication network, for example, Ethernet-based diagnostic data, to the vehicle gateway 24 to be easily provided in the vehicle 10.

Figure 3B:
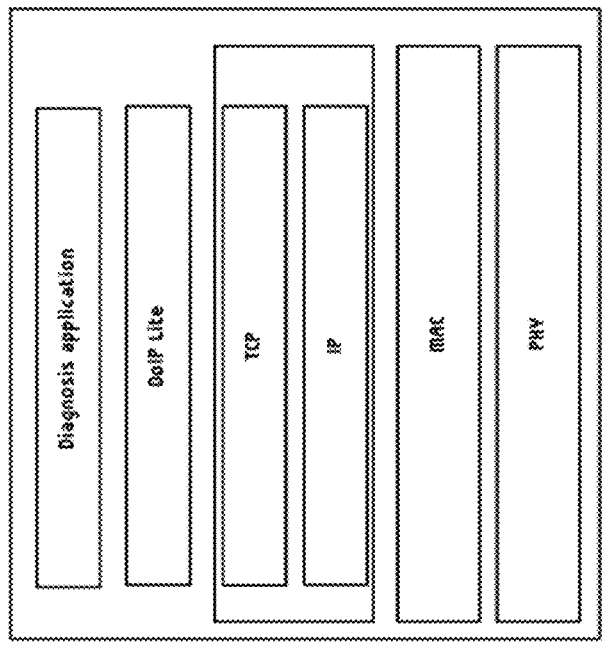
FIG. 3A and FIG. 3B describe a network architecture for handling with a diagnostic message.
Figure 3A:
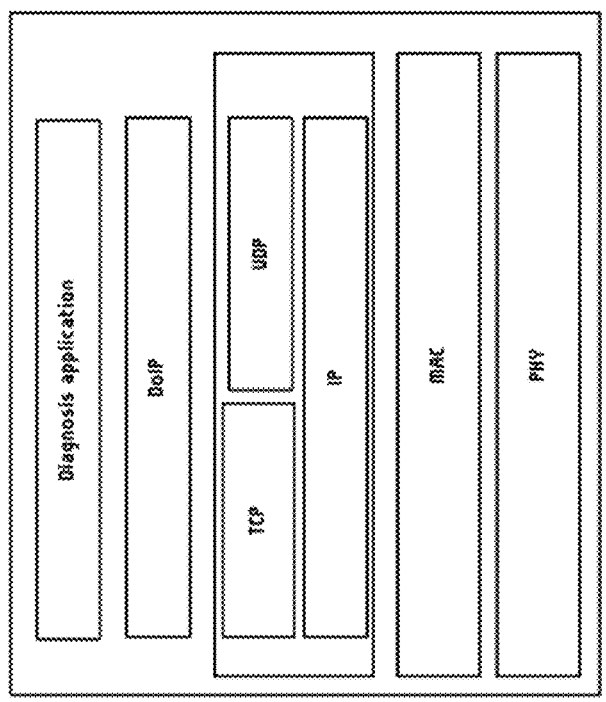

FIG. 3A and FIG. 3B describe a network architecture for handling with a diagnostic message. According to an exemplary embodiment of the present invention, FIG. 3A shows a network structure and a software structure that support a conventional diagnostic protocol (DoIP), while FIG. 3B shows a network structure and a software structure that support a diagnostic protocol (DoIP Lite).

For reference, referring to a reference structure of the ITS station defined in ISO 21217, there are an access layer, a networking and transport layer, a facilities and security and management entities, and an application layer (upper level). Referring to FIG. 3A and FIG. 3B, a conventional diagnostic protocol (DoIP) can support both a user datagram protocol (UDP) and a transmission control protocol (TCP) in a transport layer protocol. But, the diagnostic protocol (DoIP Lite) according to an exemplary embodiment of the disclosure cannot use the user datagram protocol (UDP) of the Transport Layer Protocol and can be transmitted through the Transmission Control Protocol (TCP).

Diagnostic communication using an Ethernet scheme, which can be used in the diagnosis device configured for checking the vehicle electronic control module, may not be applied to the Ethernet scheme using the conventional diagnostic protocol (DoIP) defined in ISO documents/standards. By the way of example but not limitation, when an external interface is for a CAN scheme, a load for data processing, conversion, and the like performed by the vehicle gateway 24 may occur excessively. Therefore, the diagnostic protocol (DoIP Lite) according to an exemplary embodiment of the disclosure can be defined separately so that diagnosis communication between the CAN communication and the Ethernet communication can be made possible.

The data structure of the diagnostic protocol (DoIP Lite) according to an exemplary embodiment of the disclosure may follow the data structure defined by the conventional diagnostic protocol (DoIP), but a data in the payload can be limited corresponding to the diagnostic data for CAN communication. By the way of example but not limitation, the payload may be fixed at 10 bytes. Also, the payload can be distinguished from one of the conventional diagnostic protocol (DoIP) by use of the header including different protocol versions and type definitions. By the way of example but not limitation, additional features may be specified for diagnostic requests, routing requests, remote diagnostics, software update large diagnostic data, and the like.

Furthermore, the diagnostic protocol (DoIP Lite) according to an exemplary embodiment of the disclosure utilizes only the diagnosis message and the connection/survival verify (e.g., Alive Check) function among the functions defined in the conventional diagnostic protocol (DoIP). By suppressing the usage of some functions and not using the User Datagram Protocol (UDP), the load of the in-vehicle gateway 24 can be reduced.

Figures 4A, 4B:
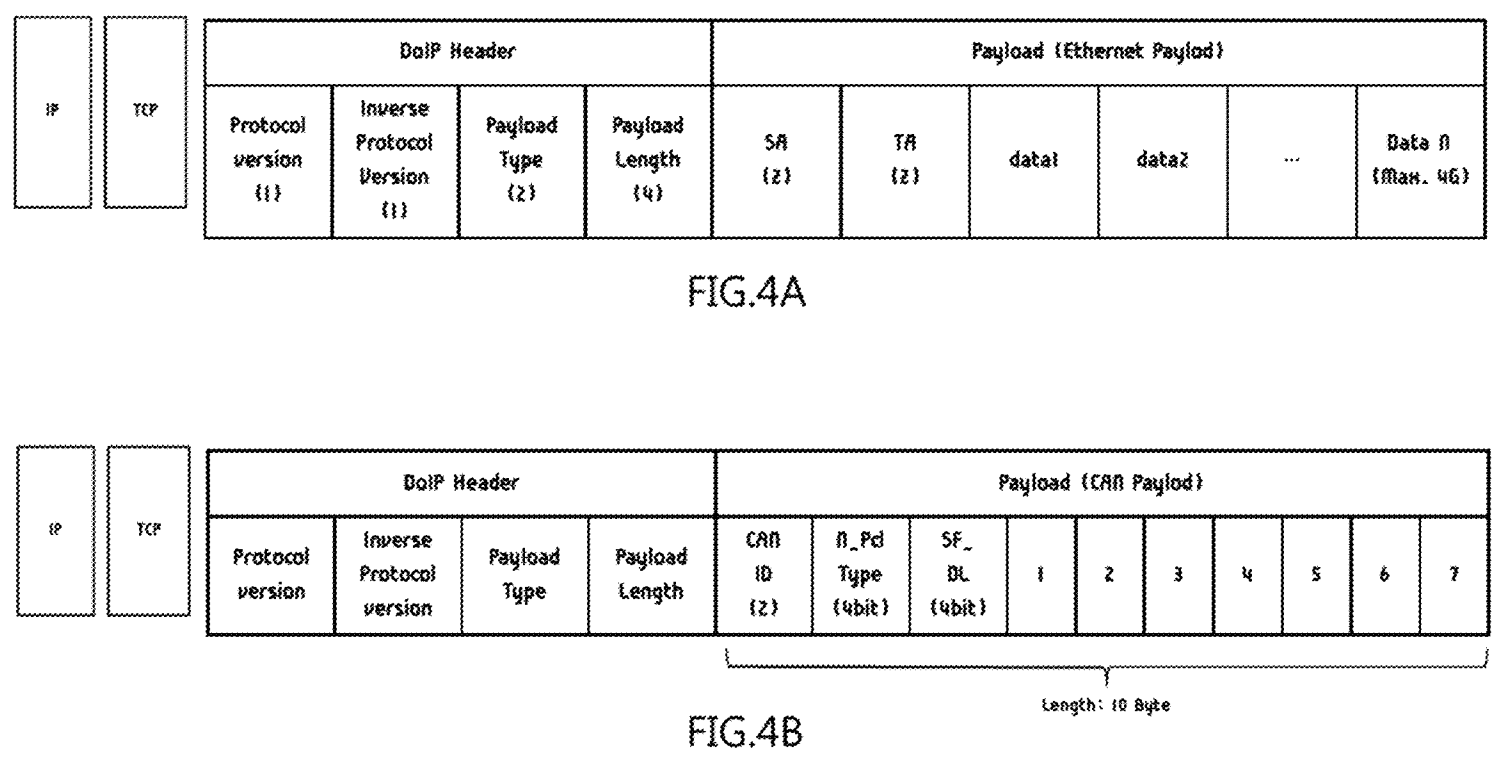

FIG. 4A and FIG. 4B show a format of the diagnostic message. FIG. 4A shows a kind of format for a message supporting a conventional diagnostic protocol (DoIP), while FIG. 4B shows a form of a message supporting a diagnostic protocol (DoIP Lite) according to an exemplary embodiment of the disclosure.

Referring to FIG. 4A, a conventional diagnostic protocol (DoIP) message may include a header of 8 bytes and a payload that may include data of 4G at maximum. The header may include a protocol version (1 byte), a protocol version (1 byte) of the inverse value, a payload type (2 bytes), and a payload length (4 bytes). The payload may include a source address (SA, 2 bytes), a target address (TA, 2 bytes) and data.

Referring to FIG. 4B, a diagnostic message according to an exemplary embodiment of the disclosure, which may be transmitted through an in-vehicle network, may include a header and a payload. The payload can correspond to the length of the CAN communication data. For reference, a length of CAN communication data can be 8 bytes.

The header may include a first field (e.g., Protocol version) for determining a protocol version, a second field (e.g., Inverse Protocol version) including a value of an inverse of the protocol version (e.g., Payload Type) that determines a payload or a length of the payload, and a third field (e.g., Payload Length) that determines the length of the payload. Herein, a fourth field (payload length) may specify that the length of the payload is 10 bytes.

The payload of 10 bytes may include both a first field of 2 bytes including an ID/address of each controller according to a CAN communication scheme and a second field of 8 bytes corresponding to a data of the CAN communication message. Herein, the first field of 2 bytes may include an ID for CAN communication having a length of 11 bits. Also, the first byte of the 8 bytes of the second field includes control information (e.g., N_Pcl Type, SF_DL) for determining the value of at least one of the arbitration field and the control field in the CAN communication message. Herein, the control information may include at least one of whether to expand the message for CAN communication, data length, and a value for controlling collision between messages.

The third field (Payload Type) in the header may include first information used for diagnosing an controller which is a target of receiving the diagnostic message, and second information used for confirming whether the controller, which is a target of receiving the diagnostic message. By the way of example but not limitation, diagnostic messages, positive/negative acknowledgments (Diagnostic Messages), Alive Check Requests (Alive Checks), or the like, among messages according to a conventional DoIP, can be delivered in a form of diagnostic messages as described in FIG.

4B. Meanwhile, omitting some of the diagnostic messages according to the conventional diagnostic protocol (DoIP) could not be issued when the connection of the Ethernet type controller is maintained, irrespective of the connection of the diagnostic device, by ignoring the received message even when a header includes an error or handing with the header is not normally performed.

FIG. 5 describes a portion of the diagnostic message shown in FIG. 4A and FIG. 4B. FIG. 5A shows a version added to the first field (Protocol version) in the header of FIG. 4A and FIG. 4B, while FIG. 5B shows a version of payload type used in the third field (Payload type) in the header of FIG. 4A and FIG. 4B.

Herein, the first field may include some information selected from values of the reserved section which is not defined in the ISO standard. For example, referring to FIG. 5A, the first field may include at least one of first information (e.g., 0xCA) indicating that an IP address of the controller, which is the target of receiving the diagnostic message, is equal to the CAN ID (ID for CAN) of the controller, second information (e.g., 0xCB) indicating that the diagnostic message is a request from an internal of the vehicle, third information (e.g., 0xCC) indicating that the CAN ID is different from the IP address of the controller to which the diagnostic message is transmitted, and fourth information (e.g., 0xCD) used for matching a length of the payload with a length of Ethernet communication data. By the way of example but not limitation, the fourth information (e.g., 0xCD) may be used for transmitting data to update a software of an controller which is a target. What can be further defined for each function in the first field may include a diagnostic request, a routing request, a remote diagnosis, a software update large capacity diagnostic data, and the like.

Also, referring to FIG. 5B, the nature of the diagnostic message can be determined by the third field. The third field may determine the nature of the diagnostic message as one of a diagnostic message, an acknowledgment (ACK), a negative acknowledgment (NACK), a large amount of data or the like.

FIG. 6 shows a method of operating a vehicle gateway.

As shown, a method is for operating an in-vehicle gateway engaged with plural controllers via different-type in-vehicle communication networks to perform a diagnostic operation. The method may include receiving a diagnostic message via a first in-vehicle communication network (step 32), analyzing the diagnostic message to recognize a first type of the first in-vehicle communication network and a target controller which the diagnostic message is transmitted to (step 34), recognizing a second type of a second in-vehicle communication network which the target controller is actively engaged with (step 36), converting the diagnostic message corresponding to the second type when the first type is different from the second type (step 38), and transmitting converted message to the target controller via the second in-vehicle communication network (step 40).

By the way of example but not limitation, the communication scheme may include an Ethernet network, a CAN, and a CAN-Flexible Data-Rate (CAN-FD). Although not shown, the analyzing the diagnostic message (step 34) may include at least one of recognizing that the diagnosis message is a controller area network (CAN) communication message when the diagnosis message is delivered an on-board diagnostics (OBD) terminal, and recognizing that the diagnostic message is an Ethernet communication message when the diagnostic message is delivered through an Ethernet port or a telematics device.

Furthermore, the converting the diagnostic message (step 38) may include converting a CAN communication message into an Ethernet communication message or converting the Ethernet communication message into the CAN communication message.

On the other hand, when a plurality of vehicle gateways are provided and two different vehicle gateways are directly connected, the communication network scheme may be an Ethernet network. When the at least one gateway includes plural gateways, the plural gateways can be directly connected to each other via the Ethernet network. Also, among the plurality of controllers, the controller connected in an Ethernet network can be actively connected to the in-vehicle gateway regardless of whether the controller operates or not.

Furthermore, the diagnostic message can be transferred via not a User Datagram Protocol (UDP) of a transport layer protocol, but a Transmission Control Protocol (TCP).

Figure 7:
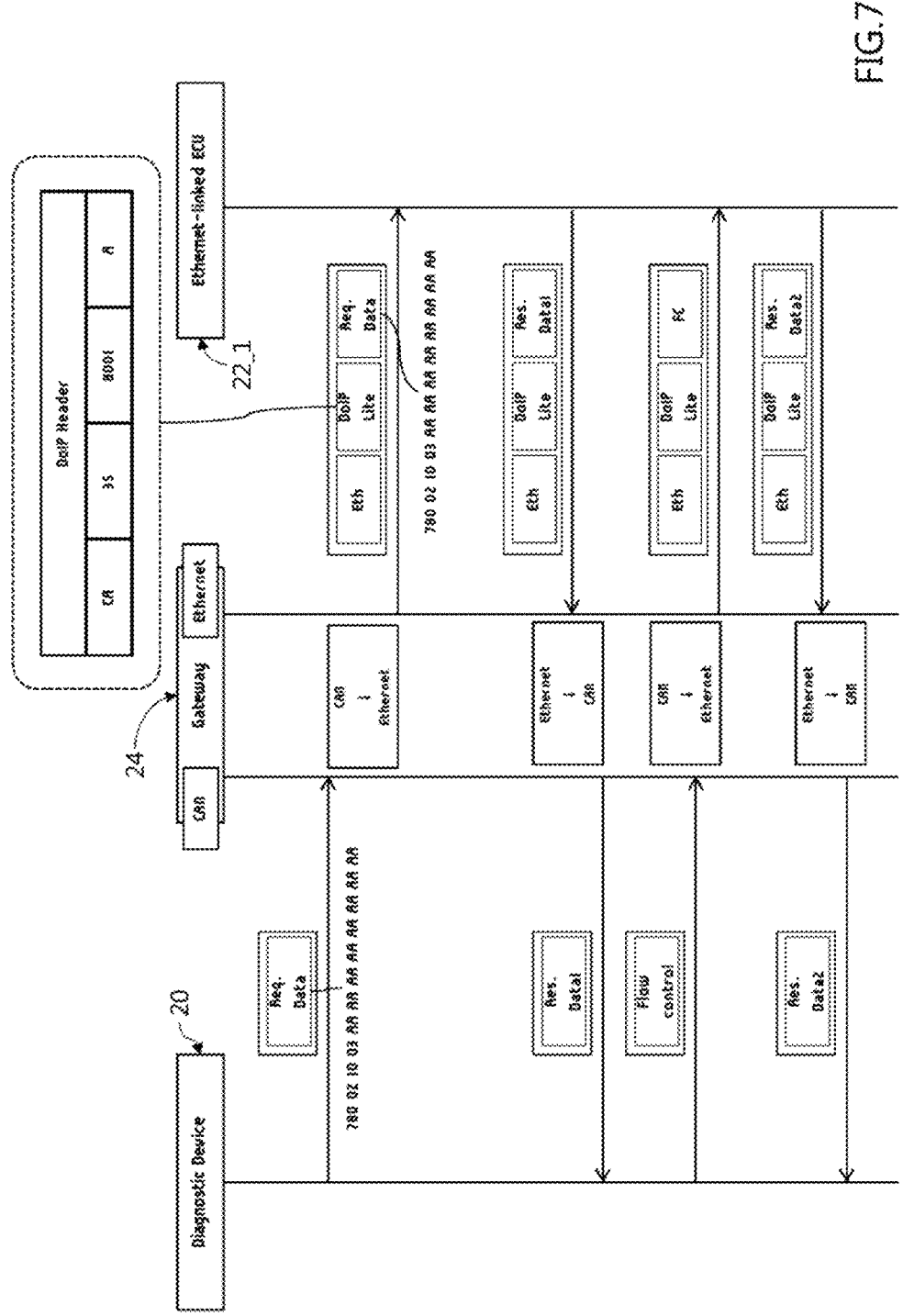
FIG. 7 shows a first example of a vehicle diagnosis process.

FIG. 7 shows a first example of a vehicle diagnosis process.

As shown, a first example of the vehicle diagnosis process may include that a diagnostic device 20 transmits a diagnosis message having a format for CAN communication to the in-vehicle gateway 24, the vehicle gateway 24 converts the diagnosis message into a converted message having an Ethernet communication format, and the converted message is delivered into an controller (ECU, 22_1).

Also, in a response to a delivered message, the controller 22_1 can transmit a response message having an Ethernet communication format to the in-vehicle gateway 24. For transmitting the response message to the diagnostic device 20, the in-vehicle gateway 24 can receive the response message having an Ethernet communication format as well as convert the response message into a converted message having a CAN communication format. After converting, the in-vehicle gateway 24 may transmit the converted message to the diagnostic device 20.

At the present time, to reduce a load occurred in a process of message conversion in the vehicle gateway 24, it is necessary to use a diagnostic message having a format described in FIG. 4 and FIG. 5.

Referring to FIG. 7, a flow control (FC), like a process of requesting diagnostic data, may proceed in a substantially similar manner.

Figure 8:
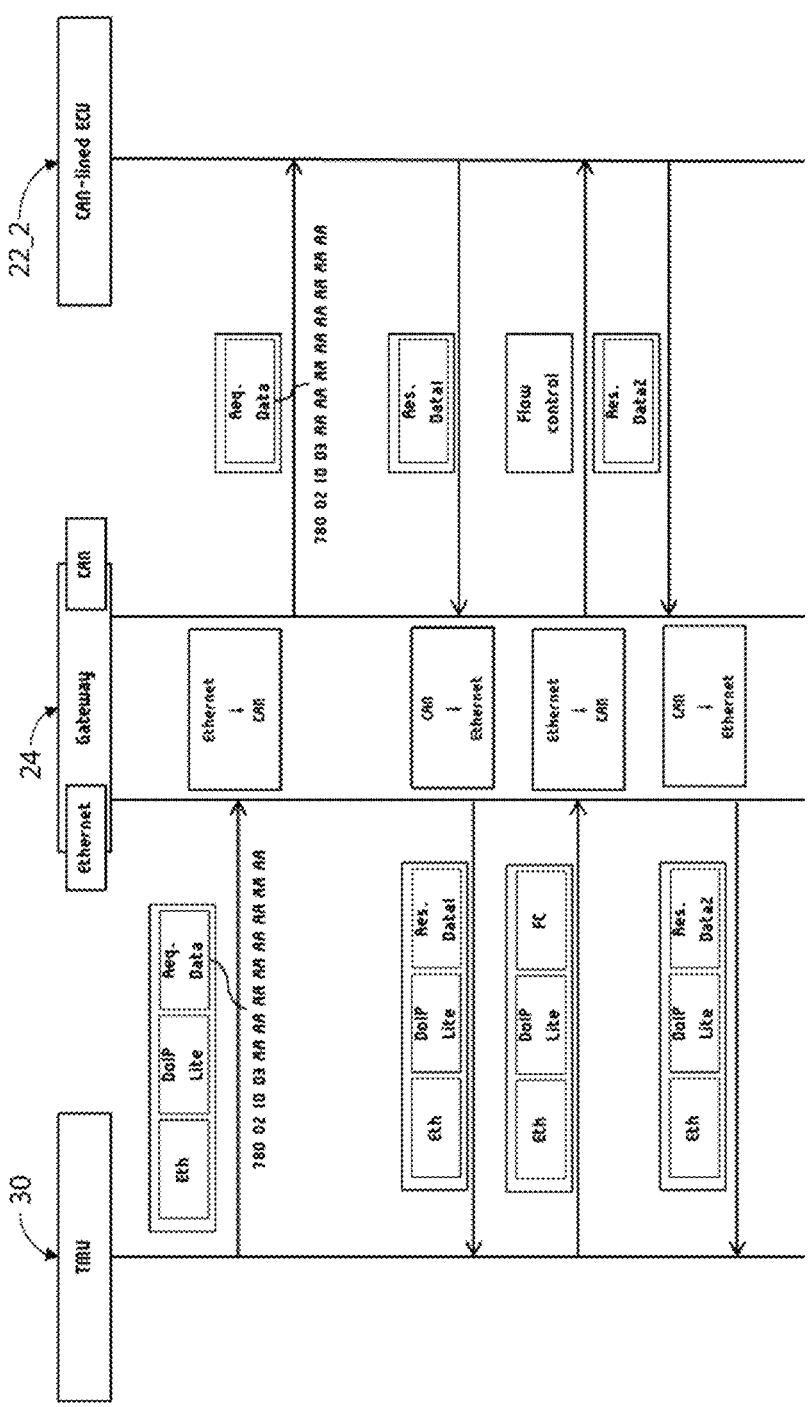
FIG. 8 describes a second example of the vehicle diagnosis process.

FIG. 8 describes a second example of the vehicle diagnosis process.

As shown, the second example of the vehicle diagnosis process can show a case where a diagnostic message is transmitted through the telematics device 30.

, when a message having the Ethernet communication format transmitted from the telematics device 30 is transmitted to the in-vehicle gateway 24, the in-vehicle gateway 24 can convert the message into a CAN communication type diagnostic message to transmit a converted message to an controller 22_2 engaged via a CAN. After converting, the in-vehicle gateway 24 transmits the converted message to the controller 22_2 connected through the CAN communication method.

The controller 22_2, which has received the diagnostic message, can transmit the response message having the CAN communication format to the in-vehicle gateway 24. The in-vehicle gateway 24 can receive the response message having the CAN communication format, convert received message to a message suitable for the Ethernet network scheme, and then transmit converted response message to the telematics device 30.

In a process of message conversion, the in-vehicle gateway 24 can carry out adding an Ethernet header simply, reducing a burden of performing the gateway function and reducing a routing time.

Referring to FIG. 8, a flow control (FC), like a process of requesting diagnostic data, may proceed in a substantially similar manner.

Figure 9:
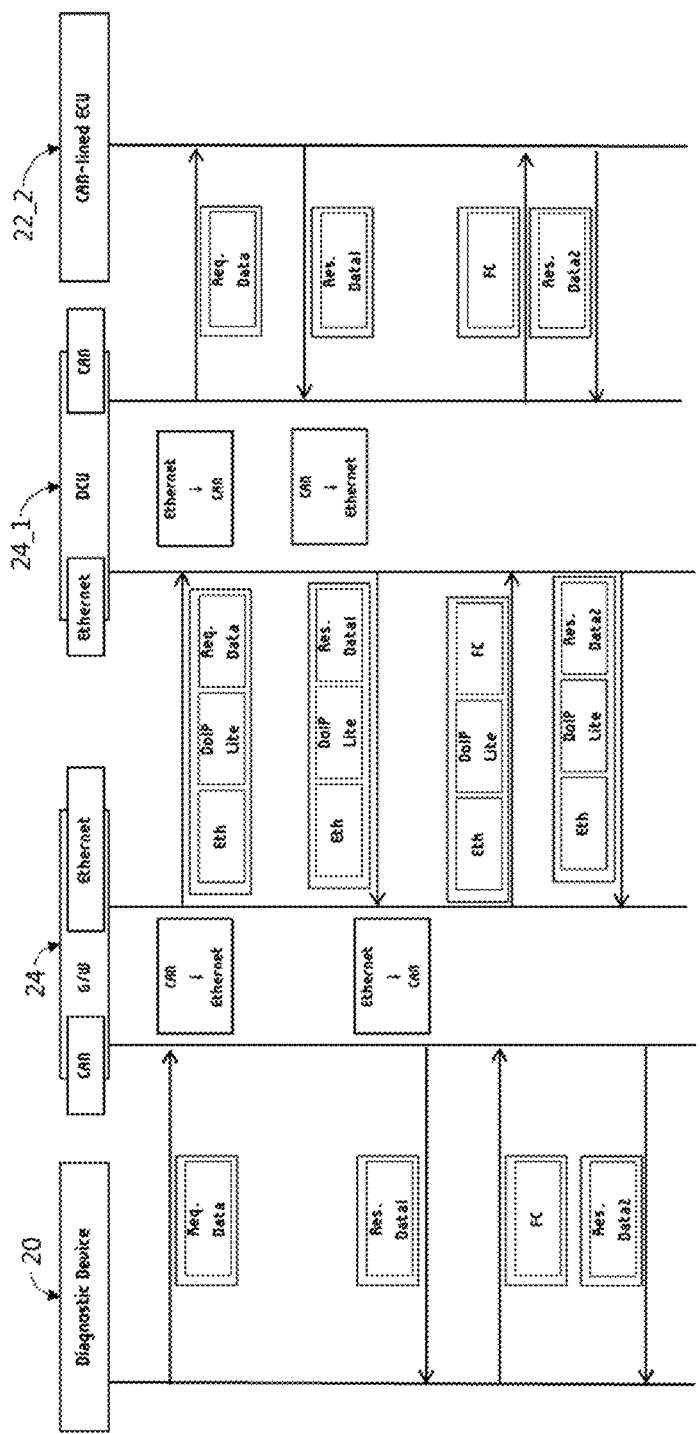
FIG. 9 describes a third example of the vehicle diagnosis process.

FIG. 9 describes a third example of the vehicle diagnosis process. FIG. 9 shows a case where a plurality of in-vehicle gateways is disposed in a path through which a diagnostic message is delivered.

As shown, the third example of the vehicle diagnosis process may include that a diagnostic device 20 transmits a diagnostic message for a CAN communication format to the in-vehicle gateway 24 while the in-vehicle gateway 24 converts the diagnostic message into a message having an Ethernet communication format and transfers the converted message to an controller 24_1 configured to perform a gateway function. The controller 24_1 configured for performing the gateway function can convert received diagnostic message having the Ethernet communication format into a diagnostic message having the CAN communication format and transmit converted diagnostic message into another controller 22_1 linked to the CAN communication scheme.

Herein, the in-vehicle gateway 24 can transmit the message with an address (e.g., IP address) of the controller 24_1, configured to perform the gateway function, referring to information (e.g., a CAN/Ethernet DB (or mapping table)) stored therein. Furthermore, since a transmitted address (e.g., IP address) can be different from a CAN ID of the controller 22_1 to be diagnosed, the in-vehicle gateway 24 can transmit the message with a format of the routing request (0xCC, see FIG. 5 (a)). Herein, the controller 24_1 configured for performing the gateway function can route the message to the local CAN based on a protocol version (0xCC). In a similar manner, the controller 24_1 configured for performing the gateway function can recognize whether the controller 24_1 itself is a diagnosis target object or another controller linked with the controller 24_1 is the diagnosis target object, and determine whether to transmit the diagnosis message.

Regarding a diagnostic result, the controller 22_2 receiving the diagnostic message can transmit a response message having a CAN communication format to the controller 24_1 configured for performing the gateway function. The controller 24_1 configured for performing the gateway function can convert the response message having the CAN communication format to a response message having an Ethernet format, and then transmit converted response message to the in-vehicle gateway 24. The in-vehicle gateway 24 can convert received response message having the Ethernet communication format into a response message having the CAN communication again to deliver converted one to the diagnostic device 20 when the in-vehicle gateway 24 may transmit the response message in the Ethernet communication scheme. The in-vehicle gateway 24 may then forward the converted message to the diagnostic device 20.

Referring to FIG. 9, a flow control (FC), like a process of requesting diagnostic data, may proceed in a substantially similar manner.

Figure 10:
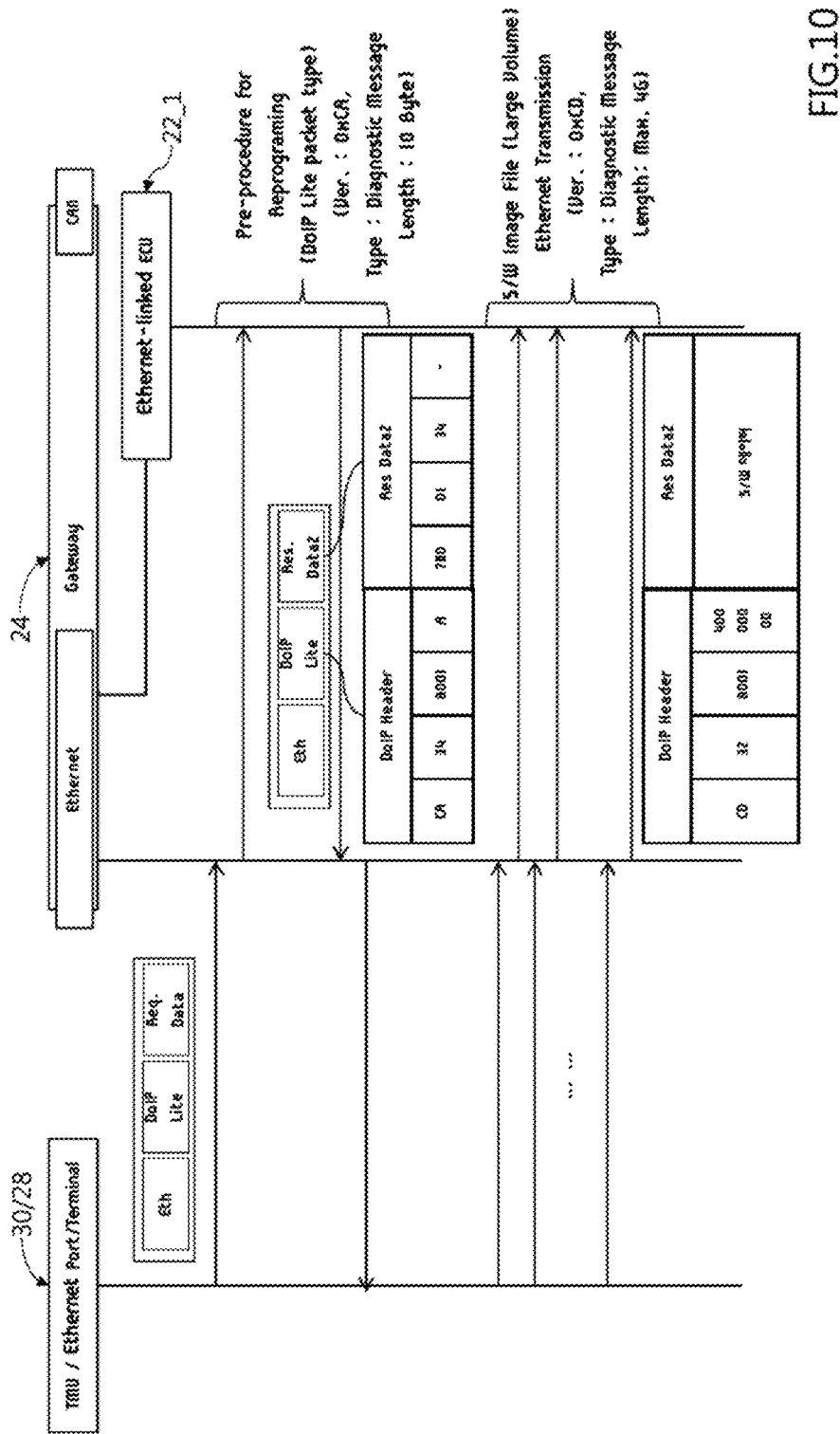
FIG. 10 describes a fourth example of the vehicle diagnosis process.

FIG. 10 describes a fourth example of the vehicle diagnosis process.

As shown, a fourth example of the vehicle diagnostic process may include that a diagnostic device 20 may transmit a diagnostic message having an Ethernet communication format to an controller 22_1 via a telematics device 30 or an Ethernet terminal/port 28, when the controller 22_1 can be directly connected to the in-vehicle gateway 24 via an Ethernet communication scheme. A case where the diagnostic message including a large data regarding update information including software will be described. By the way of example but not limitation, as shown in (a) and (b) of FIG. 5, it may be a case of reprogramming including remote reprogramming or Ethernet reprogramming via a separate Ethernet port.

An Ethernet switch can support one to one high volume Ethernet data transfer between controllers linked via Ethernet network scheme. The Ethernet switch can also support an operation of performing reprogramming (e.g., 0xCD) after some pre-procedures (e.g., security procedures including Security Access) through a message format of the diagnostic protocol (DoIP Lite).

Figure 11:
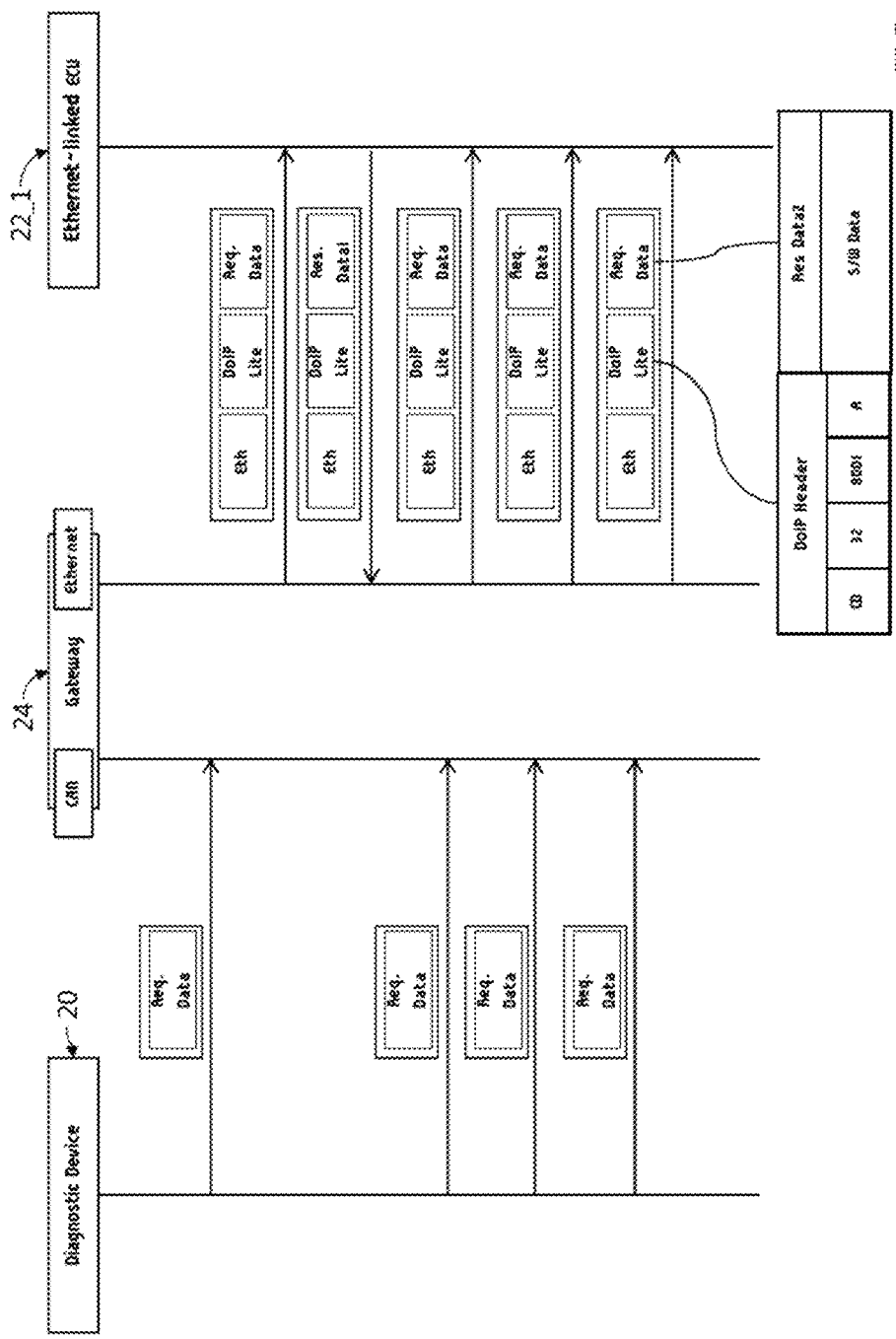
FIG. 11 describes a fifth example of the vehicle diagnosis process.

FIG. 11 describes a fifth example of the vehicle diagnosis process.

As shown, a fifth example of a vehicle diagnostic process may include that a diagnostic device 20 transmits a message having a CAN communication format for reprogramming (software update, etc.). When the software is updated by the diagnostic device 20 based on a conventional CAN communication scheme, the software can be transmitted as a conventional CAN communication frame Ethernet data so that an controller 22_1 can be reprogrammed similar to a conventional update operation.

Figure 12A:
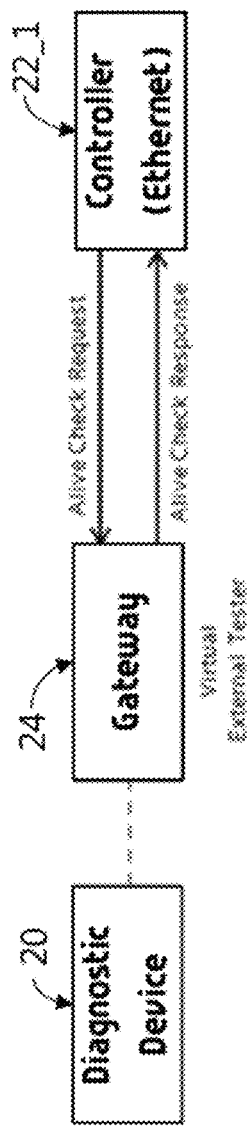
FIG. 12A and FIG. 12B describe a sixth example of the vehicle diagnosis process.
Figure 12B:
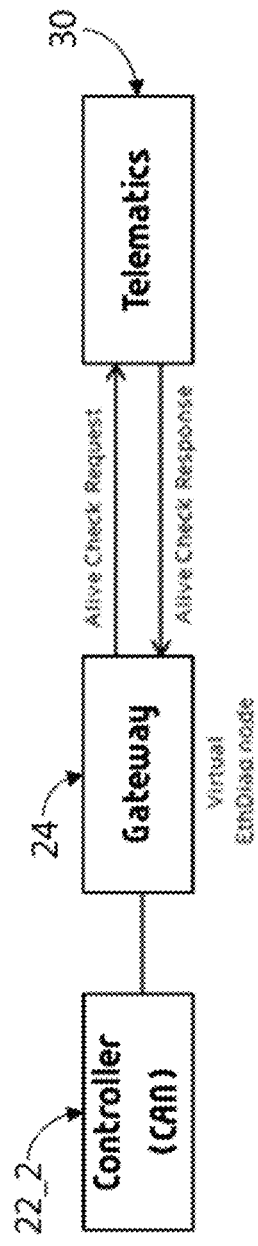

FIG. 12A and FIG. 12B describe a sixth example of the vehicle diagnosis process.

FIG. 12A shows that a diagnostic device 20 may transmit an alive verify request/response to an controller 22_1 linked via an Ethernet communication scheme through an in-vehicle gateway 24, while FIG. 12B describes that a telematics device 30 forwards an alive verify request/response to an controller 22_2 linked via a CAN communication scheme via the in-vehicle gateway 24.

Referring to FIG. 12A, the in-vehicle gateway 24 can be used to prevent a TCP connection between the nodes from releasing and to maintain the TCP connection. The Ethernet communication connection and maintenance can be achieved by the in-vehicle gateway 24 and not a diagnostic device 20. Furthermore, even when the diagnosis device is not connected, the in-vehicle gateway 24 and the controller 22_1 can be actively linked or connected to each other.

On the other hand, referring to FIG. 12B, the in-vehicle gateway 24 is configured as a virtual diagnostic device and/or a virtual diagnosis target controller.

Herein, a diagnostic message including Alive Verify Request/Response, used for checking whether the controller is connected or alive requires no data section. The conventional diagnostic message includes a logical address of diagnostic device, but the logical address would be unnecessary in the diagnostic message (DoIP Lite) according to an exemplary embodiment of the disclosure.

Figure 13:
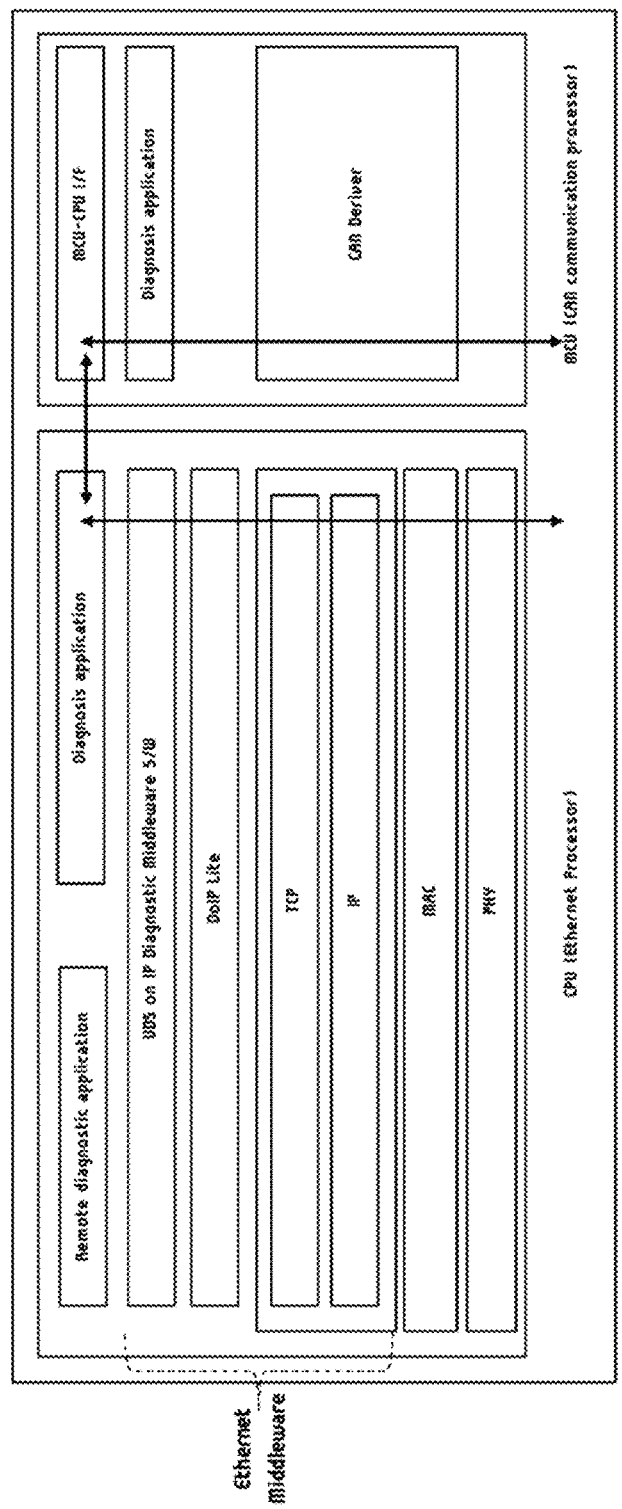
FIG. 13 describes an internal network structure of vehicle for the vehicle diagnosis process.

FIG. 13 describes an internal network structure of vehicle for the vehicle diagnosis process.

As shown, in a middleware domain, network structure and/or software architecture recognized by an in-vehicle gateway may be different from those defined in the convention diagnostic protocol (DoIP).

Operations available from the convention diagnostic protocol (DoIP) can be classified into various ranges including Vehicle Identification, Vehicle Identification w/EID, Vehicle Identification w/VIN, Vehicle Announcement, Routing Activation, Alive Check, DoIP Entity Status, Diagositc power mode information, and the like.

However, the operations based on the diagnostic message (DoIP Lite) according to an exemplary embodiment of the disclosure may include a diagnostic message for diagnosis, remote diagnosis, routing or reprogramming, an Alive Verify message for confirming TCP connection, a flow control message for supporting CAN TP communication, and the like.

In the network structure according to an exemplary embodiment of the disclosure, modules for interworking middleware configured for handling with User Datagram Protocol (UDP) with diagnostic messages (DoIP Lite) can be further added.

The above described embodiments may enable Ethernet diagnostic communication in a vehicle including a restricted environment (a diagnostic CAN support or an intra-controller diagnostic communication). The exemplary embodiments are not too much different from one using the conventional diagnosis protocol (DoIP) diagnosis procedure so that the exemplary embodiments can perform a diagnostic operation including the conventional CAN diagnostic communication as well as reduce (or not increase at least) a load for the diagnostic operation by simplifying diagnosis procedures under complexed in-vehicular network scheme. Furthermore, the exemplary embodiments can be applicable to a conventional in-vehicular network and/or a conventional in-vehicular controller.

Furthermore, there is an effect of reducing or minimizing a load for processing the Ethernet diagnostic communication to each controller is reduced, a load for handling with a controller diagnostic communication software, and a load for a the software size.

Furthermore, since the load for the gateway diagnostic communication processing is reduced, the vehicle gateway can minimize the modification of the gateway for the vehicle by adding only a module for processing the header of the Ethernet and the new diagnostic message (DoIP Lite Header) The conventional logical address and CAN ID can be simplified through the mapping table.

Furthermore, embodiments may be able to accommodate various topology environments to perform CAN diagnostic communication, Ethernet diagnostic communication, complexed diagnostic communication, or the like. It is possible to cope with all of diagnostic communication in single or multiple network communication schemes.

Furthermore, diagnostic communication can be performed through minimum modification among heterogeneous networks through a software module handling with a diagnostic message (DoIP Lite) according to an exemplary embodiment of the disclosure.

As above mentioned, embodiments can provide Ethernet communication applicable to diagnostic operation under limited environment supporting a CAN or an intra-controller communication for a diagnosis including a vehicle.

Furthermore, the exemplary embodiments can use vehicular equipment as it is, since there is no significant change as compared with a conventional CAN diagnostic communication. By changing a gateway in the vehicle, diagnostic communication between different types of network communication (e.g., CAN and Ethernet) can be achieved. Furthermore, the diagnostic protocol (DoIP) can be used for simplifying some of the diagnostic procedures in a response to a different kind of communication networks.

Furthermore, the exemplary embodiments can reduce loads occurred in Ethernet diagnostic communication for each of plural electric controllers provided within the vehicle, and reduce a size of the software in a response to reduced loads. Furthermore, the exemplary embodiments can reduce the change of the controller (ECU) even though facilitating Ethernet diagnostic communication.

The exemplary embodiments can suggest a new packet type while reducing the burden on the database mapping by use of the conventional ID of each module under the CAN system for the conventional diagnostic protocol as it is. Only gateway may be updated to recognize a new packet for diagnostic communication. It is possible to apply different communication networks in the vehicle.

Furthermore, the exemplary embodiments can cope with various topology environments, and it is possible to operate under various vehicular communication networks, for example, a CAN diagnostic communication or an Ethernet diagnostic communication alone, or a complexly-configured communication which may be performed through at least two different communication networks.

Furthermore, the exemplary embodiments can minimize changes of design or configuration for each conventional control module for new packet types of diagnostic protocols (DoIP).

The aforementioned embodiments are achieved by invention in a predetermined manner. Each of the structural combination of structural elements and features of the elements or features can be considered selectively unless specified separately. Each of the structural elements or features may be conducted without being combined with other structural elements or features. Also, some structural elements and/or features may be combined with one another to form the exemplary embodiments of the invention. The order of operations described in the exemplary embodiments of the invention may be changed. Some structural elements or features of one exemplary embodiment of the present invention may be included in another exemplary embodiment of the present invention, or may be replaced with corresponding structural elements or features of another exemplary embodiment. Moreover, it will be apparent that some claims referring to specific claims may be combined with another claims referring to the other claims other than the specific claims to form the embodiment or add new claims by amendment after the application is filed.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in a form of a carrier wave (for example, a transmission over the Internet).

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus having a processor and a memory with instructions for executing on the processor a diagnostic operation on plural controllers which are coupled via different types of in-vehicle communication networks, comprising:
   at least one of a message generator, configured to generate a diagnostic message used for the diagnostic operation on the plural controllers, and a message receiver, configured to recognize the diagnostic message,
   wherein the diagnostic message that is configured to be communicated over the in-vehicle communication networks includes a header and a payload,
   wherein the payload is determined to correspond to a length of communication data for a controller area network (CAN), and
   wherein the plural controllers includes a least one controller coupled with an in-vehicle gateway via an Ethernet communication network, and a connection between the at least one controller and the in-vehicle gateway keeps alive even when the at least one controller is not working.

2. The apparatus according to claim 1, wherein the message generator includes a diagnostic device configured to be coupled with the in-vehicle gateway via an on-board diagnostics (OBD) terminal or the Ethernet communication network.

3. The apparatus according to claim 1, wherein the message receiver includes the in-vehicle gateway configured to identify the diagnostic message in a response to the different types of in-vehicle communication networks and to transmit identified message to at least one of the plural controllers.

4. The apparatus according to claim 1, wherein the in-vehicle communication networks comprise the Ethernet communication network, the CAN, and a CAN-Flexible Data-Rate (CAN-FD).

5. The apparatus according to claim 1, wherein the diagnostic message is configured to be transferred via not a User Datagram Protocol (UDP) of a transport layer protocol, but a Transmission Control Protocol (TCP).

6. The apparatus according to claim 1, wherein the header includes:
   a first field designated for determining a protocol version;
   a second field designated for including an inverse value of the protocol version;
   a third field designated for determining the payload or a type of the payload; and
   a fourth field designated for determining the payload or a length of the payload.

7. The apparatus according to claim 6, wherein the fourth field specifies that the length of the payload is 10 bytes.

8. The apparatus according to claim 6, wherein the first field includes at least one of:
   a first data indicating that an IP address of a target controller which the diagnostic message is transmitted to is a same as a CAN ID (ID for the CAN) of the target controller;
   a second data indicating that the diagnostic message is requested by the vehicle;
   a third data indicating that the IP address of the target controller is different from the CAN ID of the target controller; and
   a fourth data making the length of the payload correspond to a length of communication data for the Ethernet communication network.

9. The apparatus according to claim 8, wherein the fourth data is used when data is transmitted to the target controller configured for software update.

10. The apparatus according to claim 6, wherein the third field includes:
   a first data used for diagnosing a target controller which the diagnostic message is transmitted to; and
   a second data used for confirming whether the target controller is available on the plural controllers.

11. The apparatus according to claim 1, wherein the payload includes:
   a first field including a CAN ID (ID for the CAN); and
   a second field matched with the communication data for the CAN,
   wherein a length of the second field is 8-byte.

12. The apparatus according to claim 11, wherein a length of the communication data for the CAN is 11 bits while a length of the first field is 2 bytes.

13. The apparatus according to claim 11, wherein the first byte of the second field having 8 bytes includes control information for determining a value of at least one of an arbitration field and a control field in a CAN communication message.

14. The apparatus according to claim 13, wherein the control information includes at least one of whether to expand the CAN communication message, a data length code, and a value for controlling collision between messages.

15. A method for operating an in-vehicle gateway engaged with plural controllers via different-type in-vehicle communication networks to perform a diagnostic operation, the method comprising:
   receiving a diagnostic message via a first in-vehicle communication network;
   analyzing the diagnostic message to recognize a first type of the first in-vehicle communication network and a target controller which the diagnostic message is transmitted to;
   recognizing a second type of a second in-vehicle communication network which the target controller is actively engaged with;
   converting the diagnostic message corresponding to the second type when the first type is different from the second type; and
   transmitting converted message to the target controller via the second in-vehicle communication network,
   wherein the plural controllers includes at least one controller coupled with the in-vehicle gateway via an Ethernet communication network, and a connection between the at least one controller and the in-vehicle gateway keeps alive even when the at least one controller is not working.

16. The method according to claim 15, wherein the analyzing the diagnostic message includes at least one of:
   recognizing that the diagnosis message is a controller area network (CAN) communication message when the diagnosis message is delivered an on-board diagnostics (OBD) terminal; and
   recognizing that the diagnostic message is an Ethernet communication message when the diagnostic message is delivered through an Ethernet port or a telematics device.

17. The method according to claim 15, wherein the in-vehicle communication networks comprise the Ethernet communication network, the CAN, and a CAN-Flexible Data-Rate (CAN-FD).

18. The method according to claim 15, wherein the converting the diagnostic message includes one of converting a CAN communication message into an Ethernet communication message and converting the Ethernet communication message into the CAN communication message.

19. A vehicle, comprising:
a plurality of controllers, each configured for providing information related to vehicle's running to a driver or an occupant or controlling a vehicular device;
a plurality of in-vehicle communication networks, each connecting at least two of the plurality of controllers to each other;
at least one gateway configured to connect each of the plurality of controllers; and
an input-output device configured to receive a diagnostic message for diagnosing the plurality of controllers, to transmit the diagnostic message to the at least one gateway, and to output a diagnostic result,
wherein the at least one gateway is connected via an Ethernet communication network when the input-output device is at least one of an Ethernet communication port and a telematics device,
wherein the at least one gateway is connected via a controller area network (CAN) when the input-output device is an on-board diagnostics (OBD) terminal, and
wherein the plural controllers includes at least one controller coupled with an in-vehicle gateway via the Ethernet communication network, and a connection between the at least one controller and the in-vehicle gateway keeps alive even when the at least one controller is not working.

20. The vehicle according to claim 19, wherein, when the at least one gateway includes plural gateways, the plural gateways are directly connected to each other via the Ethernet communication network.

* * * * *